United States Patent [19]

Celikkaya

[11] Patent Number: 5,352,254
[45] Date of Patent: Oct. 4, 1994

[54] ABRASIVE GRAIN, METHOD OF MAKING SAME AND ABRASIVE PRODUCTS

[75] Inventor: Ahmet Celikkaya, Woodbury, Minn.

[73] Assignee: Minnesota Mining and Manufacturing Company, St. Paul, Minn.

[21] Appl. No.: 65,175

[22] Filed: May 20, 1993

Related U.S. Application Data

[63] Continuation-in-part of Ser. No. 920,728, Jul. 28, 1992, Pat. No. 5,213,591.

[51] Int. Cl.$^5$ ............................................. B24D 11/00
[52] U.S. Cl. .................................. 51/295; 51/305; 51/307; 51/309
[58] Field of Search ................ 51/293, 295, 305, 307, 51/309

[56] References Cited

U.S. PATENT DOCUMENTS

| | | | |
|---|---|---|---|
| 1,528,543 | 3/1925 | Hartmann | 51/316 |
| 1,910,444 | 5/1933 | Nicholson | 51/308 |
| 2,314,340 | 3/1943 | Brown et al. | 51/295 |
| 2,541,658 | 2/1951 | Masin et al. | 51/308 |
| 3,029,160 | 4/1962 | Van Der Beck, Jr. | 117/100 |
| 3,269,815 | 8/1966 | Koopman | 51/308 |
| 3,372,066 | 3/1968 | Quaas | 148/24 |
| 3,997,302 | 12/1976 | Supkis | 51/295 |
| 4,007,020 | 2/1977 | Church et al. | 51/295 |
| 4,021,208 | 5/1977 | Oberbichler | 51/295 |
| 4,095,961 | 6/1978 | Wirth | 51/309 |
| 4,249,913 | 2/1981 | Johnson et al. | 51/295 |
| 4,252,544 | 2/1981 | Takahashi | 51/309 |
| 4,278,449 | 7/1981 | Helletsberger et al. | 51/309 |
| 4,311,489 | 1/1982 | Kressner | 51/298 |
| 4,314,827 | 2/1982 | Leitheiser et al. | 51/298 |
| 4,472,173 | 9/1984 | Brüning et al. | 51/298 |
| 4,518,397 | 5/1985 | Leitheiser et al. | 51/293 |
| 4,623,364 | 11/1986 | Cottringer et al. | 51/309 |
| 4,652,275 | 3/1987 | Bloecher et al. | 51/298 |
| 4,734,104 | 3/1988 | Broberg | 51/295 |
| 4,737,163 | 4/1988 | Larkey | 51/295 |
| 4,744,802 | 5/1988 | Schwabel | 51/309 |
| 4,770,671 | 9/1988 | Monroe et al. | 51/293 |
| 4,881,951 | 11/1989 | Wood et al. | 51/309 |
| 4,903,440 | 2/1990 | Larson et al. | 51/309 |
| 4,913,708 | 4/1990 | Kalinowski | 51/295 |
| 4,927,431 | 5/1990 | Buchanan et al. | 51/309 |
| 4,951,427 | 8/1990 | St. Pierre | 51/293 |
| 4,964,883 | 10/1990 | Morris et al. | 51/293 |
| 4,997,461 | 3/1991 | Markhoff-Matheny et al. | 51/295 |
| 5,009,674 | 4/1991 | Kunz et al. | 51/295 |
| 5,009,675 | 4/1991 | Kunz et al. | 51/295 |
| 5,011,508 | 4/1991 | Wald et al. | 51/293 |

(List continued on next page.)

FOREIGN PATENT DOCUMENTS

| | | | |
|---|---|---|---|
| 0293163A2 | 11/1988 | European Pat. Off. | C04B 35/10 |
| 0304616A1 | 3/1989 | European Pat. Off. | C09K 3/14 |
| 0346832A2 | 12/1989 | European Pat. Off. | C04B 41/45 |
| 0394213A1 | 10/1990 | European Pat. Off. | C09K 3/14 |
| 2-97457 | 4/1990 | Japan | C04B 35/10 |
| 3-146584 | 6/1991 | Japan | C09K 3/14 |
| 3-146585 | 6/1991 | Japan | C09K 3/14 |
| 1414605 | 8/1988 | U.S.S.R. | 51/295 |
| 580031 | 8/1946 | United Kingdom . | |

OTHER PUBLICATIONS

"Alumina as a Ceramic Material," The American Ceramic Society, Alcoa Research Laboratories, pp. 14-19 (1970).

STN International Abstract No. CA97(24):202355h, "Kinetics and mechanism of transformations of low-temperature forms of alumina in α-aluminum oxide in the presence of additives," Vereshchagin et al.

*Primary Examiner*—Mark L. Bell
*Assistant Examiner*—Willie J. Thompson
*Attorney, Agent, or Firm*—Gary L. Griswold; Walter N. Kirn; Gregory D. Allen

[57] ABSTRACT

An abrasive grain having a coating of grinding aid thereon is provided. The abrasive grains can be incorporated into a variety of abrasive products including bonded abrasives, nonwoven abrasives and coated abrasives.

36 Claims, 2 Drawing Sheets

U.S. PATENT DOCUMENTS

| | | | |
|---|---|---|---|
| 5,011,512 | 4/1991 | Wald et al. | 51/309 |
| 5,026,404 | 6/1991 | Kunz et al. | 51/295 |
| 5,042,991 | 8/1991 | Kunz et al. | 51/295 |
| 5,085,671 | 2/1992 | Martin et al. | 51/293 |
| 5,102,429 | 4/1992 | Wald et al. | 51/295 |
| 5,131,923 | 7/1992 | Markhoff-Matheny et al. | 51/293 |
| 5,131,926 | 7/1992 | Rostoker et al. | 51/309 |
| 5,141,527 | 8/1992 | Winkler et al. | 51/293 |
| 5,163,975 | 11/1992 | Martin | 51/293 |
| 5,185,012 | 2/1993 | Kelly | 51/309 |
| 5,190,567 | 3/1993 | Tamamaki et al. | 51/293 |
| 5,192,339 | 3/1993 | Hasegawa et al. | 51/309 |
| 5,194,072 | 3/1993 | Rue et al. | 51/309 |
| 5,204,300 | 4/1993 | Kumagai et al. | 501/127 |
| 5,213,591 | 5/1993 | Celikkaya et al. | 51/293 |
| 5,219,806 | 6/1993 | Wood | 501/127 |

ABRASIVE GRAIN, METHOD OF MAKING SAME AND ABRASIVE PRODUCTS

This is a continuation-in-part of U.S. Ser. No. 07/920,728 filed Jul. 28, 1992, now U.S. Pat. No. 5,213,591.

FIELD OF THE INVENTION

The present invention relates to abrasive grain having grinding aid coated thereon, abrasive products incorporating the abrasive grain therein, and methods of making the same.

DESCRIPTION OF THE RELATED ART

The abrasives industry generally concerns abrasive products comprising a binder and a plurality of abrasive grains. A variety of abrasive products are known, including coated abrasives, bonded abrasives, and nonwoven abrasives.

In general, coated abrasive products comprise a substrate (or backing) having a layer of abrasive grains secured thereto by means of adhesive or binder. A bonded abrasive (e.g., a grinding wheel or a cutoff wheel) generally comprises a solid mass formed from abrasive grains and binder. Nonwoven (or three-dimension, low density) abrasives generally comprise abrasive grains bound onto and in a nonwoven fibrous substrate by means of binder or adhesive.

Such abrasive products commonly include one or more grinding aids which improve performance characteristics of the abrasives. Such performance characteristics include cut rate, coolness of cut, product wear, and product life. Known grinding aids include sodium cryolite, calcium fluoride, ammonium cryolite, sodium fluoroborate, potassium tetrafluoroborate, iron sulfide, potassium aluminum fluoride, and ammonium chloride.

SUMMARY OF THE INVENTION

The present invention provides an abrasive grain comprising:
  (i) an abrasive particle having an outer surface; and
  (ii) grinding aid material bonded to the outer surface via interparticle attraction.

The present invention also provides a method of making the same, wherein the method comprises the step of mixing a plurality of abrasive particles with a sufficient amount of a grinding aid for a time sufficient to provide the abrasive grain. Typically, the abrasive particles have an average particle size in the range from about 10 to about 4,000 micrometers, more typically, in the range from about 20 to about 4,000 micrometers, and, most typically, in the range from about 50 to about 2,000 micrometers. A preferred abrasive particle is a sintered alpha alumina-based ceramic particle.

In another aspect, the present invention provides abrasive grains each comprising sintered ceramic particles having an average particle size within the range of about 10 to about 4,000 micrometers (typically about 20 to about 4,000 micrometers, more typically, about 50 to about 2,000 micrometers), each particle comprising:
  (i) a sintered alpha alumina-based ceramic core (or particle) having a surface area;
  (ii) a coating of inorganic particulates autogenously bonded to the alpha alumina-based core; the coating covering at least 70% of the surface area of the alpha alumina-based core to provide an outer surface; and
  (iii) grinding aid material present on at least a portion of the outer surface.

A preferred method for making such abrasive grain comprises the step of mixing a plurality of sintered ceramic particles having an average particle size within the range of about 10 to about 4,000 micrometers (typically within the range of about 20 to about 4,000 micrometers, more typically, about 50 to about 2,000 micrometers), each particle comprising:
  (i) a sintered alpha alumina-based ceramic core; and
  (ii) a coating of inorganic particulates autogenously bonded to the alpha alumina-based core; the coating covering at least 70% of the surface area of the alpha alumina-based core to provide an outer surface with a sufficient amount of a grinding aid for a time sufficient to provide the abrasive grain.

In this application:
"interparticle attraction" refers to adhesion (preferably binder-free adhesion) of two or more particles primarily as a result of attractive electrostatic forces, but may include the contribution of forces selected from the group consisting of van der Waals forces, magnetic forces, gravitational forces, and combinations thereof;

"abrasive particles" refer to materials in the form of particles having a Mohs hardness of at least 8 (preferably, at least 9), and include particles selected from the group consisting of sintered alpha alumina-based ceramic particles, fused alumina particles (including heat-treated versions thereof), fused alumina-zirconia particles, cubic boron nitride particles, diamond particles, silicon nitride particles, silicon carbide particles, garnet particles, boron carbide particles, and combinations thereof;

"base particle" refers to unsintered alpha alumina-precursor-based ceramic grain precursor which is converted to alpha alumina-based ceramic material by sintering;

"impregnate" or "impregnating material" refers to material which is impregnated into porous base particles (i.e., which, through capillary action, is introduced into its pores);

"grinding aid material" refers to particulate material, the addition of which has a significant effect on the chemical and/or physical processes of abrading which results in improved performance;

"grinding aid material bonded to the outer surface via interparticle attraction" refers to an abrasive particle to which a multiplicity of particles of grinding aid material in the form of particles has been applied to loose abrasive particles wherein the result is discrete particles of grinding aid bonded via interparticle attraction to the outer surface of the abrasive particles such that the discrete particles of grinding aid typically cover in the range from about 10 to about 90 percent of the outer surface;

"grinding aid material present on the outer surface of the abrasive grain" refers to an abrasive particle having at least one grinding aid particle (preferably a plurality of grinding aid particles) in contact and attached by bonding means (e.g., interparticle attraction and/or a binder or adhesive material) to at least a portion of the outer surface of the abrasive particle, wherein discrete particles of grinding aid typically cover in the range from about 10 to about 90 percent of the outer surface;

"autogenously bonded" refers to a surface coating bonded to the ceramic particle (core) without any type of external bonding medium such as flux, vitreous bonding material, organic binder, glass or the like; rather, bonding is the result of binder-free adhesion between the sintered core and the sintered coating;

"nucleating agent" as used herein refers to a material which provides an externally introduced alpha alumina growth site(s); and "nucleating material" as used herein refers to a nucleating agent or a precursor thereof, The performance characteristics of abrasive products (e.g., coated abrasives, bonded abrasives, and nonwoven abrasives) containing abrasive grain according to the present invention is typically better than for comparable abrasive products which do not contain such abrasive grain.

When it is said abrasive products contain abrasive grain according to the present invention, it is to be understood that grinding aid material which was bonded via interparticle attraction to a loose abrasive particle may be bonded or partially bonded to the outer surface of the abrasive particle by adhesive or binder when the grain is incorporated into an abrasive product.

The drawings constitute a part of the specification and show exemplary embodiments of abrasive products including particles according to the present invention therein. In some instances, relative material thicknesses and component sizes are exaggerated in some figures of the drawing to facilitate understanding.

DETAILED DESCRIPTION OF THE PREFERRED EMBODIMENTS

The present invention pertains to abrasive particles each having a surface coating of grinding aid thereon. The abrasive particles can be, for example, particles of sintered alpha alumina-based ceramic, fused alumina (including heat-treated versions thereof and fused alumina-zirconia), cubic boron nitride, diamond, boron carbide, silicon carbide, garnet, and combinations thereof. Such abrasive particles are well known in the abrasive art, are commercially available and some may be made by techniques known in the art, while others may occur naturally.

Sintered alpha alumina-based ceramic particles are preferably made by preparing and sintering base particles as described below. The base particles can be modified by the inclusion therein of metal oxide modifier and/or a coating of inorganic particulate thereon.

SINTERED ALPHA ALUMINA-BASED CERAMIC PARTICLES

The Base Particle

Suitable base particles can be prepared by sol-gel process such as disclosed, for example, in U.S. Pat. Nos. 5,011,508 (Wald et al.); 4,881,951 (Wood et al.); 4,770,671 (Monroe et al.); 4,744,802 (Schwabel); 4,574,003 (Gerk); 4,518,397 (Leitheiser et al.); and 4,314,827 (Leitheiser et al.),. the disclosures of which are incorporated herein by reference, and U.S. Pat. No. 4,623,364 (Cottringer et al.).

Preferably, the alpha alumina-precursor-based particles are prepared by a sol-gel process employing a dispersion comprising from about 2 to about 60 wt-% alpha-aluminum oxide monohydrate (typically boehmite), although other hydrates may be used. The weight percent is based on a total of hydrate plus liquid carrier, without regard to adjuvants or additives. The boehmite can be prepared by any of various conventional techniques or it can be acquired commercially. Suitable boehmite is commercially available, for example, under the trade designations "DISPERAL" from Condea Chemie, GmbH, of Hamburg, Germany, and "DISPAL" from Vista Chemical Co. of Houston, Tex. These aluminum oxide monohydrates are in alpha form, are relatively pure (including relatively little, if any, hydrate phases other than monohydrate), and have a high surface area. The typical and preferred liquid carrier is deionized water.

A peptizing agent or dispersion aid may be used in the boehmite dispersion to produce a more stable hydrosol or colloidal dispersion. Monoprotic acids which may be used as the peptizing agent include acetic, hydrochloric, formic, and nitric acids. Nitric acid is preferred. Multiprotic acids are normally to be avoided since they rapidly gel the dispersion, making it difficult to handle or mix in additional components. Some commercial sources of boehmite contain an acid titer (e.g., acetic, formic, or nitric acid) to assist in forming a stable dispersion.

A defoamer may be added to the dispersion to aid in the reduction of froth or foam during the mixing process. Common defoamers include alcohols.

The boehmite dispersion optionally includes a precursor of a modifier (e.g., oxides of magnesium, zinc, cobalt, nickel, zirconium, hafnium, iron, manganese, chromium, yttrium, praseodymium, cerium, samarium, ytterbium, neodymium, lanthanum, gadolinium, cerium, dysprosium, erbium, titanium, and mixtures thereof) which enhances some desired property of the finished product or increases the effectiveness of a subsequent processing step (e.g., the sintering step). Such precursors are generally introduced in the form of a salt (typically a metal salt material) soluble in the liquid carrier of the dispersion. Typically, the precursor is a water soluble metal salt.

The dispersion may contain a nucleating material to enhance the transformation of the alpha alumina precursor to alpha alumina. Suitable nucleating materials include fine particles or precursors of alpha alumina, alpha ferric oxide, chromia, titanates, and any other material which will nucleate the transformation. Nucleating agents are disclosed, for example, in U.S. Pat. Nos. 4,744,802 (Schwabel) and 4,964,883 (Morris), and copending application having U.S. Ser. No. 07/552,489, filed Jul. 16, 1990, the disclosures of which are incorporated herein by reference.

For additional details regarding the inclusion of manganese oxide and precursors thereof in the dispersion, see copending application having U.S. Ser. No. 07/995,964, filed Dec. 23, 1992, the disclosure of which is incorporated herein by reference.

The dispersion can be formed by any suitable means. For example, the dispersion can be formed by simply introducing the aluminum oxide monohydrate, optional additives, and water carrier to a ball mill or other satisfactory mixing device, and mixing until the resulting dispersion is acceptable. Once the dispersion is formed, it is then gelled and/or dried (i.e., dewatered). The gel can be formed by any conventional technique such as the addition of a dissolved or dispersed metal-containing modifying additive (e.g., magnesium nitrate), or the sol can be at least partially dewatered to form the gel. Common dewatering steps include air drying in an oven or in ambient conditions, introducing a vacuum, decanting, filtering, pressing, etc.

If it is desired that the resulting sintered alpha alumina-based ceramic particle (or core) include zirconium oxide and/or cerium oxide, a preferred method for introducing zirconium oxide and/or cerium oxide is by adding zirconia and/or ceria to the alpha aluminum oxide monohydrate dispersion prior to gelation. These materials can be added to the dispersion as a sol or as a fine powder. For additional details, see copending applications having U.S. Ser. Nos. 07/951,654 and 07/951,443, each filed Sep. 25, 1992, the disclosures of which are incorporated herein by reference.

The partially dewatered gel can be shaped or crushed into irregularly shaped particles. Shaping of the gel may be accomplished by conventional means such as pressing, molding, casting, extrusion or cutting, or some combination of those steps, with drying. The resulting particles can be in any desired shape, for example, a rod, triangle, pyramid, disk, diamond, cone, or similar shape. Irregularly shaped abrasive grain products are conveniently provided, for example, by crushing dried gel to the desired particle size. Conventional crushing means include roll crushing, ball milling, and hammer milling.

Air drying steps may be used to remove any remaining water from either the shaped or unshaped gel. Drying can be accomplished, for example, in a forced air oven at a temperature in the range of about 50° C. to about 200° C., preferably between about 100° C. and 150° C. Generally, drying is conducted until the product contains 1 to 40%, preferably, 5 to 20% by weight, free-water.

After shaping (or crushing) and drying the dried gel, the resulting base particles are calcined to remove any trace water or solvent. During calcining, the base particles are generally heated to a temperature in the range from about 400° C. to about 1,000° C., preferably about 400° to about 800° C. The base particles are held within this temperature range until the free water and preferably over 90 wt-% of any bound volatiles are removed. If the particle precursor contains a modifier precursor, the base particles are preferably calcined for a period of time sufficient to achieve essentially complete conversion of the modifier precursor to metal oxide.

Conversion of Base Particles to Alpha Alumina-Based Particles

The base particles can be converted into sintered alpha alumina-based particles (or cores) through application of one or more treatments before application of the grinding aid. To improve physical properties of the alpha alumina-based particles (e.g., to increase their density and/or toughness), the base particles can be impregnated with various materials. Further, to improve the surface of the alpha alumina-based base particles with respect to adhesion to a binder and/or to provide increased surface area for bonding of the grinding aid material, the base particles can be coated with inorganic particles in a any of variety of ways. The alpha alumina-based particles may be improved by more than one of these optional treatments.

A. Optional Impregnation of the Base Particles with Modifier Precursor

General methods of impregnating particles from dried alumina hydrate dispersions are described in U.S. Pat. No. 5,164,348 (Wood), the disclosure of which is incorporated herein by reference.

In general, the calcined base particles are porous (e.g., they generally have pores about 5-10 nanometers in diameter extending therein from an outer surface). Impregnation of the pores with an appropriate modifier precursor provides for increases in density and can improve toughness of the sintered alpha alumina-based particle. The modifier or component for impregnation (i.e., the impregnate) will generally be a precursor of a metal oxide provided in the form of one or more salts of a metal (e.g., a nitrate or acetate salt). The metal salt material is dissolved in a liquid medium, and the resulting solution is then mixed with the porous base particles. The impregnation process is thought to occur through capillary action. The capillary action can be improved by subjecting the porous base grits to vacuum treatment before the mixing step.

While any of a variety of liquid media may be used for the impregnating solution, water (preferably, deionized water) is used. The concentration of the salt in the liquid medium is typically in the range from about 5% to about 40% dissolved solids, on an oxide basis. In general, there should be at least 50 ml of solution added to achieve impregnation of 100 grams of porous base particle material, preferably, at least about 60 ml of solution to 100 grams of base particle.

In some instances, more than one impregnation step may be utilized. The same impregnation solution may be applied in repeated treatments, or subsequent impregnation solutions may contain different concentrations of the same salts or different salts or different combinations of salts.

During heat treatment of the impregnated base particle to form the sintered, ceramic, alpha alumina-based particles, the impregnate (or modifier) may react with alumina to form a reaction product. For example, the oxides of cobalt, nickel, zinc, and magnesium typically react with alumina to form a spinel structure. Yttria typically reacts with alumina to form the garnet crystal phase $3Y_2O_35Al_2O_3$. Praseodymium, samarium, ytterbium, neodymium, lanthanum, gadolinium, cerium, dysprosium, erbium, and mixtures of two or more of these rare earth metals typically react with alumina to form garnet, beta alumina, or phases having a perovskite structure. Certain rare earth oxides and divalent metal oxides react with alumina to form a hexagonal rare earth aluminate structure represented by the formula $LmMal_{11}O_{19}$, wherein Lm is a trivalent metal ion such as La, Nd, Ce, Pt, Sm, Gd, or Eu and M is a divalent metal cation such as Mg, Mn, Ni, Zn, Fe, or Co. Hexagonal rare earth aluminates have exceptional properties in an abrasive particle and typically are present within the abrasive particle as a whisker(s) or platelet(s). Such whiskers or platelets typically have a length of about 0.5 micrometer to about 1 micrometer, and a thickness of about 0.5 micrometer or less. It is believed that the whiskers or platelets may inhibit crack propagation. These whiskers or platelets are more likely to occur in the absence of a nucleating agent.

B. Optional Particulate Surface Coating

To improve the shelling resistance of the abrasive particles, the surface area of the particles can be increased by providing a coating of fine ceramic particles on the surface of the alpha alumina-based particle. The purpose of providing an abrasive particle with increased shelling resistance is to increase the abrasive article's life by decreasing the amount of grain lost from the article because of the grain pulling out from the bond. U.S. Pat. No. 5,011,508 (Wald et al.), the disclosure of which is incorporated herein by reference, describes autogenously bonding fine ceramic precursor particles to the surface of a non-sintered base particle and then sintering to provide an abrasive particle with high surface area.

Base particles can be prepared, for example, as described above in the section entitled "The Base Particle." The non-sintered particles are relatively soft. When tumbled together in a mixer, edges of the non-sintered particles break off producing fine particles which are redeposited upon the surface of the non-sintered base particles via mechanical impingement as tumbling is continued. Tumbling may be accomplished, for example, by charging a mixer with a specified amount of non-sintered particles (e.g., dried or calcined particles). The non-sintered particles are tumbled for a time sufficient to generate an adequate amount of fine particles without undesirably rounding the edges of the non-sintered particles. Continued tumbling causes the fine particles to redeposit on the surface of the non-sintered particles. The redeposited fine particles form as separated protuberant masses on the surface of the non-sintered particles. The resulting ceramic material which is provided by sintering has an increased surface area which results in improved adhesion to the bond system and/or provides an increased surface area for the bonding of the grinding aid material.

Some experimentation may be needed to determine the exact tumbling time period. Typical times range from about 5 to about 180 minutes. The tumbling time may easily be determined by someone skilled in the art. It is preferred to use a mixer with baffles or flanges to increase the energy generated during the tumbling, and thus reduce the tumbling time. The preferred mixer design is a ball mill without the milling media.

After the tumbling step, the non-sintered particles are sintered to increase the hardness and density of the grain and to securely bond the fine particles thereto.

C. A Preferred (Optional) Inorganic Particulate Surface Coating

The base particles can be coated with inorganic particles as described herein below, before they are sintered.

Further, it is possible to coat impregnated base material. Typically, it is not necessary to dry the base particles prior to the step of coating. In some instances, coating and impregnation may be conducted simultaneously.

The resulting sintered ceramic particles preferably have an average particle size within the range of about 10 to about 4,000 micrometers, and preferably each particle comprises:
(i) a sintered alpha alumina-based ceramic core having a surface area; and
(ii) a coating of inorganic particulates autogenously bonded to the alpha alumina-based core; the coating covering at least 70% of the surface area of the alpha alumina-based core to provide an outer surface.

The coating of inorganic particles on the base particle provides an abrasive particle having an increased surface area or surface area ratio for contact with binding agent or adhesive of an abrasive product and/or the grinding aid material. Abrasive grains prepared as described in the parent of the present application (i.e., U.S. Ser. No. 07/920,728, filed Jul. 28, 1992), the disclosure of which is incorporated herein by reference, can have a surface area ratio of at least 2:1, and, more preferably, at least 4:1. The surface area ratio, which is a measure of the increase of the surface area of the abrasive particle, is determined by dividing the surface area of the abrasive particle after application of the coating of inorganic particulate material by the surface area of the untreated abrasive particle, for a given grade. The grading standard for abrasive grains is found in American National Standard Institute (ANSI) Standard No. B74.18, 1984. Measurements of surface area ratios are described in U.S. Pat. No. 5,011,508 (Wald et al.), the disclosure of which is incorporated herein by reference.

Preferably, at least 70% (more preferably, at least 80%) of the surface area of the sintered alpha alumina-based particle (or core) is covered with the inorganic coating, although greater than 90% coverage may be obtained. With respect to the amount of coverage, the intent is to make reference to the amount of exposed sintered particle (core) surface in the resulting coated grain. Thus, coverage of at least 70% means that no more than about 30% of the total area of the underlying sintered base particle surface is exposed (i.e., not covered with particulates). The amount of coverage in this context is not meant to refer to the nature (e.g., porosity) of the particulate coating. The coating can be continuous or discontinuous.

Preferably after sintering, the resulting coating on the sintered particle (or core) is relatively porous. Such a coating on the sintered abrasive grain provides a high surface area which improves adhesion of the binder in an abrasive product to the abrasive grain. In this context, the term "porous" is meant to indicate that the coating has a density of less than 90% (preferably less than 80%) of theoretical. Most preferably, the coating has a density of at least 40%, but less than 70% of theoretical. This is not meant, however, to imply that the coating is discontinuous, but rather to reflect that pores extend therethrough. Further, the density value given is meant to refer to the average density of the coating, not the density of the individual fused particles that make up the coating (i.e., the coating comprises dense particles packed together with some open space therebetween).

In contrast to the coating, the sintered alpha alumina-based particle (or core) generally has a relatively high density (typically at least greater than 90% of theoretical). Preferably, the sintered alpha alumina-based core has a density of at least 95% of theoretical, more preferably, at least 97%. The density of abrasive grains can be readily measured with a helium gas pycnometer, such as one available under the trade designation "MICROMERITICS ACCUPYC 1330" from Micromeritics of Norcross, Calif.

After the sintering step, the coating may contain more than one layer of inorganic particles. Typically, there are 2 to 30 layers, more typically, 3 to 20 layers. Preferably, at least 5 to 15 layers of inorganic particles are provided, stacked on one another. Such stacking leads to the preferred porosity of the coating and also the continuous nature of coating. Multilayered coatings are readily obtained by providing a sufficient number of inorganic particles in the suspension.

During the sintering step, the inorganic particles in the coating typically sinter to one another resulting in a coating having good structural integrity.

The inorganic particles may be comprised of any of a variety of inorganic materials. Preferably, the particles comprise metal oxides, metal nitrides, metal carbides, metal oxynitrides, metal oxycarbides, silica, or combinations thereof. Examples of such inorganic materials include transitional alumina, alpha alumina, hydrated aluminas, yttria, magnesia, rare earth metal oxides, zinc oxide, iron oxide, silicates, chromium oxide, titanium oxide, nickel oxide, yttrium alumina garnet, hexagonal rare earth aluminate, alumina zirconia, zirconia oxide, silicon nitride, alumina oxynitride, titanium carbide, titanium nitride, silicon aluminum oxynitride, silicon aluminum oxycarbide, and combinations thereof. At present, it is believed that zirconia and alumina coatings are preferred for many applications.

If the coating of the sintered alpha alumina-based core contains a silicon containing compound, it is preferred that such compound be crystalline. If such a compound is not crystalline, it is preferable that the coating contain (after sintering) less than about 5% by weight (more preferably less than 1% by weight; most preferably less than about 0.5% by weight) silica.

Preferably, at least 90% by weight of the alpha alumina-based cores are in the range from about 50 to about 2,000 micrometers. Base particles of appropriate size can be readily achieved through conventional processes including various cutting, casting, crushing or classification processes such as screening.

The inorganic particles should be of appropriate size to provide a coating having minimal spacing between inorganic particles, and preferably substantially continuous coverage of the surface of the base particles. The average particle size of the inorganic particles generally is in the range from about 0.01 to about 20 micrometers, preferably, in the range from about 0.01 to less than 10 micrometers, and, most preferably, in the range from about 0.01 to about 1 micrometer. Inorganic particles within the preferred size range can be obtained, for example, from various commercial suppliers or by wet ball milling.

In one preferred process, the coating of inorganic particles is applied to the calcined or uncalcined (i.e., dried gel) base particles by deposition from a liquid medium. The liquid medium can be water (preferably deionized water) or an organic solvent. Generally, if the liquid medium is water or a polar organic solvent, the base particle should be calcined before deposition of the coating. However, if the liquid medium is a non-polar organic solvent, then it is not necessary to calcine the base particle prior to coating.

Suitable non-polar organic solvents include cyclohexane, hexane, and toluene. Suitable polar solvents include acetone, methanol, ethanol, and methyl ethyl ketone. The preferred liquid medium is water, more preferably, deionized water.

Generally, the coating mixture comprises in the range from about 0.01% to about 20% (preferably about 0.1% to about 5%) by weight of inorganic particulates, wherein the weight percentage is based on the weight of particulates, plus carrier liquid (water, acetone, etc.), without regard to other additives or adjuvants. The mixture may include adjuvants such as wetting agents or dispersing agents, typically in amounts effective to provide the properties desired to the mixture or dispersion. The suspension (mixture) may be formed by any conventional means, such as mixing with a continuous mixer, batch mixer, ball milling device, cement mixer, a vibrator, or a tumbler.

Coating can be accomplished by simply mixing the base particles with the coating mixture. The combination generally comprises mixing by any of a variety of techniques including screw auger, batch mixer, continuous mixer, cement mixer, vibrator, tumbler, or the like. One preferred technique is to feed the coating mixture and base particles into a continuous mixer from individual feed streams.

In order to provide a substantially uniform coating of inorganic particulates on the base particles, a minimum ratio of volume of carrier liquid to weight of particles to be coated is preferred. Generally, at least 50 ml of liquid volume is the minimum preferred in order to ensure good inorganic particulate coating of 100 grams of base particle material (prepared as described above). Preferably, about a 20% excess of liquid volume over this amount (i.e., 60 ml liquid per 100 grams of base particle) is desirable to ensure good coating and processing. It is noted that this ratio is the same ratio presented hereinabove for preferred impregnation of the base particle.

The base particles are porous (i.e., they have an open porosity including relatively small pores (5–10 nanometers) therein). Such pores are typically too small for penetration of the inorganic particulates. Through capillary action, the liquid is pulled into the pores bringing the inorganic particles to the surface of each base particle. This facilitates provision of a desirable even coat, provided sufficient coating mixture is used, with substantially complete Coverage of the outer surface of each base particle is obtained. Generally, enough liquid to saturate (or at least 70% saturate) the base particles is preferred.

Following coating, the coated base particles are dried sufficiently such that they do not stick together. It is foreseen that, in typical applications, the coated base particles are dried by forced air drying at temperatures of about 100° C. to about 150° C. Preferably, excess liquid is removed, for example, by decanting prior to drying.

The thickness of the coating is generally in the range from about 0.1 to about 20 micrometers (preferably about 0.5 to about 10 micrometers), and, most preferably, in the range from about 0.5 to about 2 micrometers. The amount of coating can also be calculated on the basis of weight percent of coating relative to the base particle. Typically, the coating preferably comprises, on average, in the range from greater than 0.01 to about 10 percent by weight, based on the weight of the coated inorganic particulates and the base particle before application of the inorganic particulates. More preferably, the coating comprises, on average, in the range from about 0.1 to about 5 percent (most preferably, in the range from about 0.1 to about 2 percent by weight, based on the weight of the coated inorganic particulates and the base particle before application of the inorganic particulates.

In general, achievement of the stated amount and nature of coating is readily accomplished through practice of the method as outlined herein, especially if the preferred ratio of liquid volume to weight of base particles is practiced. When a ratio of about 50 ml liquid volume to 100 grams base particles is used, there is typically 100% or near 100% of coverage of the inorganic particulates onto the surface of the base particles. Further, if impregnate is simultaneously utilized, typically about 100% of the pore volume of the base particles is filled with impregnate. A step of removing excess solution and/or particulates is typically avoided when such a ratio is used. In addition, the use of this ratio typically provides uniform and substantially continuous coverage. Multiple coating steps may be used to build a thicker coating.

Alternate methods of providing the particulate coating on the base particles are possible. For example, if the base particles are wet (substantially saturated, i.e., at least 70%, preferably 100% of the pore volume is filled with liquid and a liquid film is present on the surface of the base particles), for example, with water, a coating can be provided by adding (e.g., sprinkling) inorganic particulate to the wet base particles or other mixing. In general, the liquid (typically deionized water) on the surface of each base particle acts as a binder to attract and retain the inorganic particulates thereby aiding in the formation of a coating. Further, the base particles and inorganic particulates may be mixed together dry, followed by the addition of liquid (typically deionized water) and sufficient mixing to distribute the liquid and provide a coating of the inorganic particles on the base particles. Generally, enough liquid should be used to achieve saturation as defined above, since the liquid serves as a temporary binder for the coating.

Further, it is possible to first impregnate porous base particles with an impregnating solution and then coat the (wet) impregnated base particles with the (dry) inorganic particulates. Alternatively, in some instances, impregnation may be conducted after first providing a coating of the inorganic particulates. The latter process is possible because the coating is relatively porous.

If the base particles are mixed with a liquid medium which contains modifier precursor as described above, while at the same time having inorganic particulates as described above suspended therein, both impregnation and inorganic particulate coating can result. Inorganic coating does not inhibit impregnation. Further, impregnation conducted simultaneously with coating does not interfere with the capillary action.

The coating particulates may include nucleating material. In general, nucleating material may be readily applied by treating base particles with a liquid medium having nucleating material therein. The preferred liquid medium is deionized water. The coating mixture generally contains a sufficient amount of nucleating material to provide the base particle in the range from about 0.01% to about 10% (preferably 0.1% to 5%) nucleating material by weight (calculated as nucleating agent on an elemental oxide basis), based on the weight of the sintered abrasive particle. The nucleating material may be applied to the base particles prior to impregnation, simultaneously with impregnation, prior to inorganic particulate coating, simultaneously with inorganic particulate coating, or simultaneously with both impregnation and inorganic particulate coating.

As indicated herein, the nucleating material may be added either during base particle formation (i.e., in the sol-gel process) or after base particle formation, as described in this section. Depending upon when the nucleating material is added, products of different character may result. If the nucleating material is added during the sol-gel process, it generally is dispersed throughout at least some of the based particles. On the other hand, if added after base particle formation, the nucleating material generally occupies only the outermost portions of the base particle.

If the nucleating material is added during the sol-gel process, the resulting sintered alpha alumina-based particle(s) (or core(s)) generally has the nucleating material dispersed throughout, results in uniform hardness and toughness. On the other hand, if the nucleating material is added after base particle formation, interior portions of the resulting sintered alpha alumina-based particle (or core) will have different hardnesses and toughnesses than its outer portion.

A preferred abrasive particle onto which grinding aid is provided on the surface thereof as described herein comprises the sintered product of the porous base particle having a coating comprising inorganic particulates as described herein. The core may include modifiers therein. The outer surface of the core includes thereon an autogenously bonded coating comprising the sintered product of an inorganic particulate coating. The inorganic coating preferably covers at least 70% of the outer surface of the sintered core, and preferably is at least about 0.1 micrometer thick.

A method of making such preferred abrasive particles comprises the steps of:
 (a) providing a mass of porous first base particles comprising alpha alumina precursor material, each particle of which is sinterable to an alpha alumina-based abrasive grain;
 (b) mixing with the mass, in the presence of a liquid, second particles having the same or different composition and are much finer than the first base particles until the second particles are distributed over the exterior surface of each first base particle, the second particles being capable of autogenous bonding to the exterior surface of the first base particles upon sintering; and
 (c) heating the particles to remove the liquid and then sintering the first base particles and causing autogenous bonding of the second particles to the exterior surface of each of the first base particles to provide sintered alpha alumina-based ceramic particles.

Generally, step (b) is selected from the group consisting of
 (A) (i) adding the second particles to the liquid to provide a dispersion; and (ii) adding the dispersion to the porous first base particles; and
 (B), (i) adding the liquid to the porous first base particles to provide liquid-impregnated particles; and
 (ii) mixing the second particles with the liquid impregnated particles.

Generally, the second particles are inorganic particles having an average particle size in the range from about 0.01 to about 20 micrometers. Preferably, the inorganic particles are less than about 1 micrometer in diameter.

Following the step of coating the porous base particles, the coated material (i.e., coated base particles) is heated to remove the liquid and then sintered to generate ceramic abrasive grain material as a sintered product. The step of sintering converts each porous base particle to a dense alpha alumina-based core, with the inorganic particles forming an autogenously bonded coating thereon.

Preferably, sufficient inorganic particles are added to the porous base particle to cover on the average at least 70% (preferably at least 80%) of the surface of each sintered base particle. In another aspect, it is preferable to provide a sufficient amount of material to provide an average coating thickness on each final sintered particle of at least 0.1 to about 20 micrometers (preferably about 0.5 to about 10 micrometers).

Preferably, the porous, base particles comprise alpha alumina-precursor particles prepared according to a sol-gel process such as described above under the heading "The Base Particle." In some applications, the precursor particles are calcined before the second particles are added thereto.

In certain preferred methods according to the present invention, the porous base particles are provided with metal oxide precursor such as a metal salt, sometimes referred to as modifier material, therein prior to the step of sintering. The metal oxide precursor may be introduced into the base particles by impregnation conducted simultaneously with, before, or after coating with the inorganic particles. In general, the step of impregnation comprises mixing porous base particles with a carrier liquid having the modifier or its precursor (e.g., a metal salt) dissolved therein.

Preferred methods comprise utilization of preferred ratios of volume of carrier liquid to weight of base particles during the various mixing steps. In particular, a minimum such ratio is necessary and desirable in order to achieve substantially uniform impregnation and/or coating. When the base particles are formed from the preferred alpha alumina oxide monohydrate sol-gel process as described, generally, at least about 50 ml (preferably 50-60 ml) of carrier fluid is utilized per 100 grams of base particle material to achieve uniform coating and/or impregnation.

For additional details regarding this preferred (optional) inorganic particulate surface coating, see the examples in the parent of the present application, U.S. Ser. No. 07/920,728, filed Jul. 28, 1992, the disclosure of which is incorporated herein by reference.

Other treatments and coatings of the abrasive particles known in the abrasive art (e.g., diamond-like coatings, carbide coatings, nitride coatings and oxide coatings, other than described above) for improving the abrasion performance (e.g., cut rate and longevity) of abrasive products containing the resulting abrasive grain may be useful in the preparation of abrasive particles according to the present invention.

Sintering of the Abrasive Particle Precursor

The base particles or treated (e.g., impregnated, tumbled, and/or coated) base particles are precursors to ceramic abrasive grain according to the present invention.

The sintering of the precursor grains can be accomplished through a variety of conventional processes. Typically, sintering is conducted at a temperature in the range from about 1,200° C. to about 1,650° C. Sintering generally can be accomplished within a time period of a few seconds to about 120 minutes. Sintering of various types of base grits is described, in general, in U.S. Pat. No. 4,314,827 (Leitheiser et al.), the disclosure of which is incorporated herein by reference. The techniques of sintering applied therein may be applied to treated base particles as described herein. It is also within the scope of this invention to sinter in an inert or reducing atmosphere.

Grinding Aid Surface Coating

Preferably, grinding aid material covers at least 10% of the surface of an abrasive particle. Loose abrasive grain according to the present invention typically has no resin binder, adhesive, or other chemical means of holding the grinding aid to the grain.

It is believed in the art that a grinding aid (1) decreases the friction between the abrasive grains and the workpiece being abraded, (2) prevents the abrasive grain from "capping" (i.e., prevents metal particles from becoming welded to the tops of the abrasive grains), (3) decreases the interface temperature between the abrasive grains and the workpiece, and/or (4) decreases the grinding forces. In general, the inclusion of a grinding aid in an abrasive product increases the abrading characteristics of the product (e.g., useful life and/or faster rate of cut).

Suitable grinding aid materials include those known in the abrasive art. The grinding aid material can be organic or inorganic. Examples of classes of grinding aids include waxes, organic halide compounds, halide salts and metals and their alloys, and combinations thereof. Organic halide compounds typically break down during abrading and release a halogen acid or a gaseous halide compound. Examples of such materials include chlorinated waxes (e.g., tetrachloronaphthalene, pentachloronaphthalene, and polyvinyl chloride). Examples of halide salts include sodium chloride, potassium cryolite, potassium fluorophosphate, sodium cryolite, ammonium cryolite, potassium tetrafluoroborate, calcium fluoride, sodium tetrafluoroborate, ammonium chloride, silicon fluorides, potassium chloride, and magnesium chloride. Examples of metallic grinding aids include tin, lead, bismuth, cobalt, antimony, cadmium, iron, and titanium. Other grinding aid materials include sulfur, organic sulfur compounds, graphite, zinc stearate, lithium stearate, boron nitride, iron pyrites, and metallic sulfides (e.g., zinc sulfide, iron sulfide, manganese sulfide, molybdenum disulfide), and combinations thereof. The preferred grinding aid is potassium tetrafluoroborate.

One or more particulate grinding aids can be utilized in this invention, and in some instances this may produce a synergistic effect. If more than one is used, it is desirable that they be blended together to form a homogeneous mixture before coating on the abrasive particle. Suitable blending techniques include ball milling, tumbling, shaking, air mixing, and blending.

Preferred particulate grinding aid material is bonded to the surface of an abrasive particle by interparticle attraction. Typically, no binder is used to adhere the grinding aid to the abrasive particle, nor is the grinding aid dissolved and recrystallized onto the grain.

A preferred method for making abrasive grain according to the present invention involves charging a mixer with abrasive particles with the desired grinding aid. Suitable mixers include air mixers, V-blenders, and ball mills. It is preferred that the mixer have no baffles or flanges within.

Preferably, the weight ratio of grinding aid to abrasive particles charged into the mixer is in the range from about 1:100 to about 1:1 (preferably, about 1:15 to about 1:2), although this ratio can vary depending upon the density of the grinding aid material.

Typically, the grinding aid material covers on the average at least 10% (more typically in the range from about 10% to about 90%) of the outer surface of each abrasive particle, although greater than 90% coverage may be obtained. Preferably, grinding aid material covers in the range from about 25% to about 90%, more preferably in the range from about 40% to about 60%, of the outer surface of each abrasive particle. With respect to the amount of coverage, the intent is to make reference to the amount of exposed abrasive particle surface. Thus, coverage of about 90% means that about 10% of the total area of the underlying abrasive particle is exposed (i.e., not covered with grinding aid particulate). The amount of coverage in this context is not meant to refer to the nature (e.g., porosity) of the particulate coating. The coating can be continuous or discontinuous.

The grinding aid particles preferably are of appropriate size to provide a coating having minimal spacing between grinding aid particles. The average particle size of the grinding aid material generally is in the range from about 0.01 to about 50 micrometers, preferably in the range from about 0.1 to less than 30 micrometers, and most preferably in the range from about 0.1 to about 10 micrometers. Grinding aid particles within the preferred size range can be obtained, for example, from various commercial suppliers or by ball milling (typically dry ball milling).

The thickness of the grinding aid coating can vary depending upon extent of coating treatments. In general, a sufficient amount of grinding aid treatment is conducted to provide a coating thickness in the range from about 0.1 to about 200 micrometers (preferably about 1 to about 100 micrometers). For typical preferred applications, the coating thicknesses is preferably in the range from about 1 to about 50 micrometers. Coating thickness is generally controlled by controlling the weight of grinding aid material to weight of base particles, as well as by the relative size and number of the particles.

Abrasive Grains

Abrasive grain according to the present invention comprises an abrasive particle with a surface coating thereon comprising a grinding aid material. The grinding aid material can be present as individual particle(s) or as an agglomeration(s) of particles.

Preferably, the grain comprises an alpha alumina-based base particle or core having an inorganic particulate coating thereon, and a surface coating comprising at least one grinding aid material. Up to 100% by weight of the underlying preferred (sintered) particle or core may comprise alpha alumina. However, up to 45% by weight of the underlying (sintered) particle or core may comprise a metal oxide (or product of sintering metal oxide) on an oxide basis.

Figure 4:
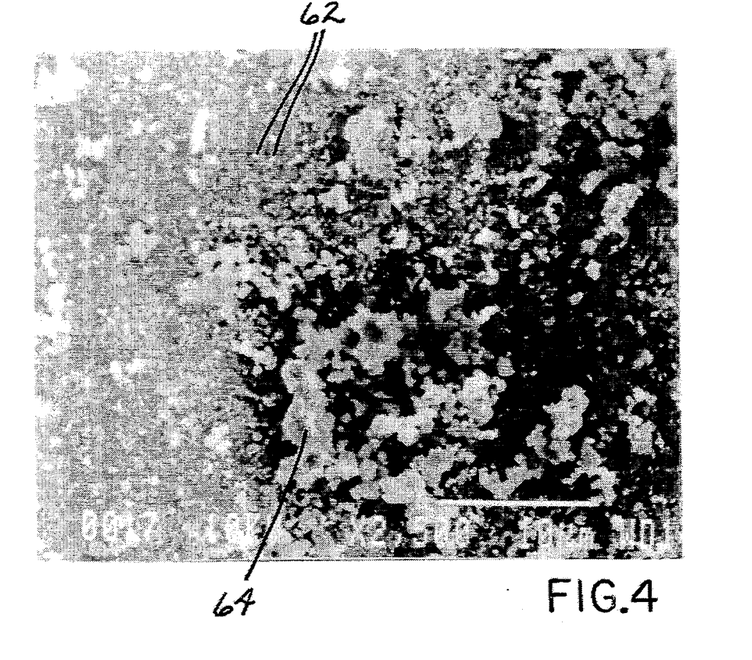
FIG. 4 is a scanning electron photomicrograph of an abrasive grain according to the present invention at 2,500X.
Figure 5:
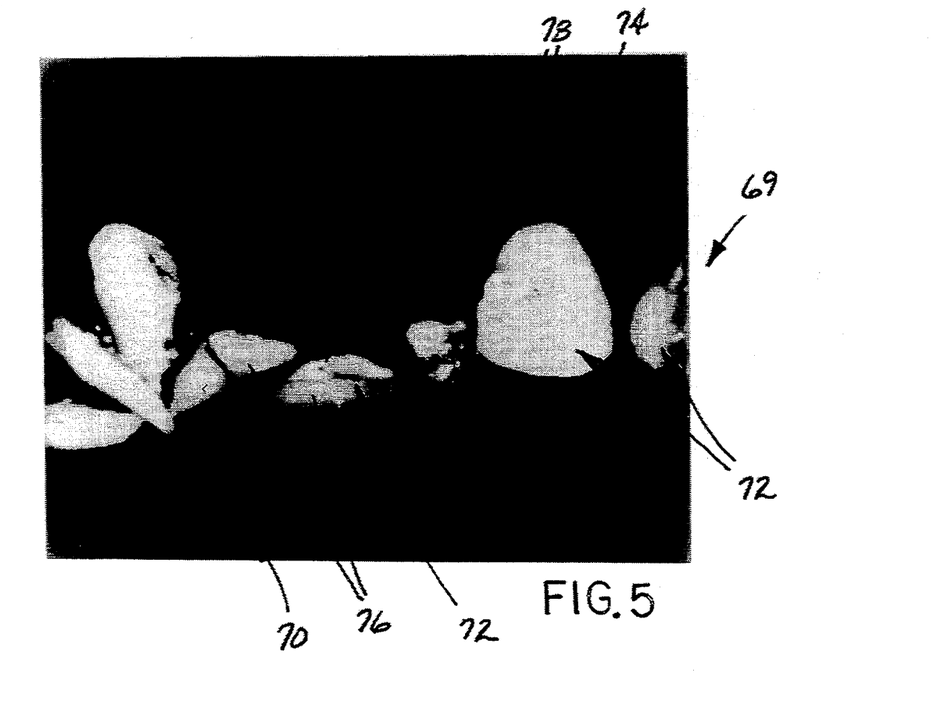
FIG. 5 is an optical photomicrograph of a cross-section of a coated abrasive article according to the present invention at 25X.

Attention is now directed to FIGS. 4 and 5. FIG. 4 is a scanning electron photomicrograph of an abrasive grain according to the present invention (Example 10) at 2500X. Examination of the photomicrograph reveals substantially continuous coating of inorganic particles 62 covering a ceramic core (not shown). Covering continuous coating of inorganic particles 62 is noncontinuous coating of grinding aid material 64.

FIG. 5, is an optical photomicrograph of a cross-section of a coated abrasive article according to the present invention at 25X. Coated abrasive article 69 comprises abrasive grains 72 bonded to backing 70 by binder 74. Abrasive grains 72 comprise abrasive particles 76 and grinding aid material 78.

Abrasive Products

The present invention includes within its scope the provision of abrasive products including abrasive grains as described herein. Preferably, the abrasive grains will have been prepared according to the processes described herein and comprise the sintered product of a porous base particle having a grinding aid particulate coating thereon.

One type of abrasive product according to the present invention comprises a backing (substrate) with abrasive grains as described herein adhered thereto by a binder. The backing may be cloth, polymeric film, fiber, nonwoven web, paper, or combinations thereof or treated versions thereof. Any of a variety of inorganic or organic binders may be utilized. The abrasive grains may be applied in one layer or in a plurality of layers. A preferred method of making coated abrasives is described in U.S. Pat. Nos. 4,734,104 (Broberg) and 4,737,163 (Larkey), incorporated herein by reference. In general, coated abrasive products, including abrasive grains according to the present invention therein, are improved with respect to potential for longevity and cut rate.

Figures 1, 2:
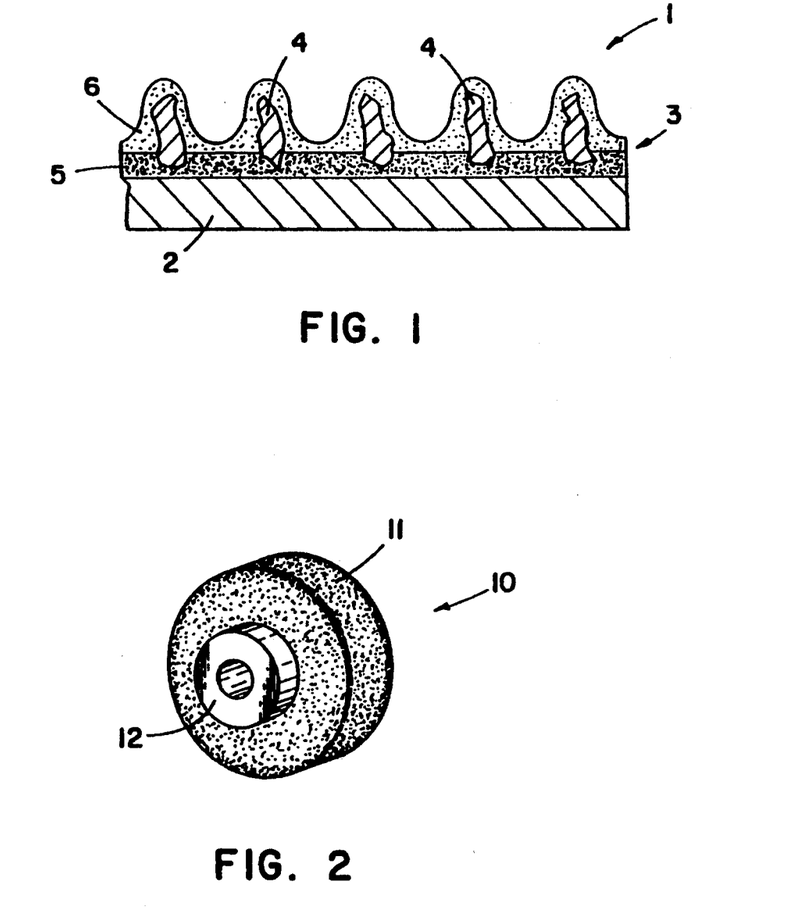
FIG. 1 is a fragmentary cross-sectional schematic view of a coated abrasive product according to the present invention.
FIG. 2 is a perspective view of a bonded abrasive product according to the present invention.

An example of a coated abrasive product is depicted in FIG. 1. Coated abrasive 1 comprises backing (substrate) 2 and abrasive layer 3. Abrasive layer 3 comprises abrasive grains 4 which are secured to backing 2 by binder (i.e., by make coat 5 and size coat 6).

Bonded abrasive products according to the present invention generally comprise shaped masses of abrasive grain as described herein held together by organic, metallic, or vitrified binder. A particularly common shaped mass for abrasive products is a grinding wheel. Referring to FIG. 2, wheel 10 comprises abrasive grains 11 molded in a wheel and mounted on hub 12. Techniques for making bonded abrasives are well known in the art and include the method described in U.S. Pat. No. 4,997,461 (Markhoff-Matheny et al.), the disclosure of which is incorporated herein by reference for its teaching of how to make vitrified bonded abrasives, and U.S. Pat. No. 3,867,795 (Howard), the disclosure of which is incorporated herein by reference for its teaching of how to make organic bonded bonded abrasives.

Figure 3:
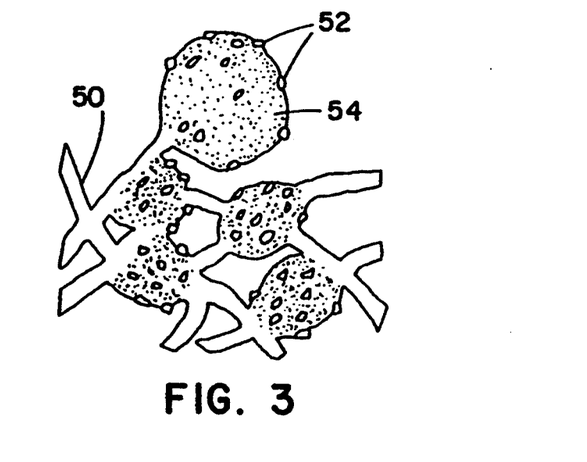
FIG. 3 is an enlarged schematic view of a nonwoven abrasive product according to the present invention.

Nonwoven abrasive products incorporating abrasive grains according to the present invention typically comprise an open porous lofty polymer filament structure (substrate) having the abrasive grains of the invention distributed throughout the fiber structure and bonded therein by an organic binder. Typical fibrous filament structures usable with such constructions comprise polyamides, polyesters, or polypropylene. In FIG. 3, a schematic depiction enlarged about 100X of a typical nonwoven abrasive article is provided. The article comprises a fibrous mat 50 as a substrate, onto which abrasive grains 52 are adhered by binder 54. For further details regarding nonwoven abrasive products, see U.S. Pat. No. 2,958,593 (Hoover et al.), the disclosure of which is incorporated herein by reference.

A wide variety of binders may be used in abrasive products according to the present invention, including conventional ones. Useful binders include phenolic, urea-formaldehyde, melamine-formaldehyde, polyester resins, glue, aminoplast resins, epoxy resins, acrylate resins, urethane resins and combinations thereof. The binder may also include additives such as grinding aids, fillers, coupling agents, dyes, pigments, wetting agents, and dispersion aids. Examples of such grinding aids are described above under the section entitled "Grinding Aid Surface Coating." Examples of fillers include calcium carbonate, silica and calcium metasilicate.

Abrasive products or articles according to the present invention may contain, as particulate material therein, 100% abrasive grains which have been improved according to the descriptions herein. In addition or alternatively, the abrasive articles may contain a blend of abrasive grains according to the present invention with conventional abrasive grains or diluent grains. Conventional abrasive grains usable in this fashion include, for example, fused aluminum oxide (including fused alumina zirconia and heat-treated fused alumina), silicon carbide, garnet, diamond, cubic boron nitride, and sol-gel-derived ceramic abrasive grains. Diluent grains include marble, gypsum, and glass. Generally, at least about 10% by weight, preferably about 50% to about 100% by weight, of the grains of an abrasive product according to the present invention are of improved abrasive grains as described herein.

Abrasive grains according to the present invention may be combined with abrasive agglomerates. Examples of abrasive agglomerates are provided in U.S. Pat. Nos. 4,652,275 (Bloecher et al.) and 5,078,753 (Broberg et al.), the disclosures of which are incorporated herein by reference.

Objects and advantages of this invention are further illustrated by the following examples, but the particular materials and amounts thereof recited in these examples, as well as other conditions and details, should not be construed to unduly limit this invention.

EXAMPLES

The abrasive grains were made according to one of the procedures outlined below, and then the abrasive grains were incorporated into a coated abrasive fiber disc as described below. The coated abrasives were tested according to one of the test procedures described below. In some instances, the test results are given as a percent of a comparative example. The comparative example was normalized to 100%, and then the example was measured against this 100%. All abrasive grain and binder formulations are based upon weight.

GENERAL PROCEDURE I FOR MAKING ABRASIVE GRAINS

The following were dispersed together using a high shear mixer: 69.8 parts of approximately 60° C. deionized water; 2.3 parts of technical grade (70% concentrated) nitric acid, and 28.5 parts alpha aluminum oxide monohydrate powder (commercially available under the trade designation "DISPERAL" from Condea Chemie, GmbH, Hamburg, Germany). The resulting sol was dried over a 24 hour period starting at about 100° C. and increasing the temperature to about 180° C. After drying, the sol was a friable solid that was then crushed and screened. The screened particles passed through a screen containing 1 mm openings, but were retained on a screen containing 0.125 mm openings. The screened particles were then fed into the end of a rotary kiln (i.e., calciner) to substantially remove the bound volatiles. The rotary kiln had a hot zone feed end temperature of 350° C., and exit end temperature of 650° C. These particles are hereinafter designated calcined particles.

In this procedure, the impregnating mixture and coating mixture were combined into one. Into a 19 liter container were added the calcined particles along with an impregnating/coating mixture. To prepare the impregnating/coating mixture, 230 parts of an aqueous lanthanum nitrate/neodymium nitrate/yttrium nitrate solution (8% $La_2O_3$, 8% $Nd_2O_3$, and 8% $Y_2O_3$ on an oxide basis) 190 parts of an aqueous magnesium nitrate solution (10% MgO on an oxide basis), and 5 parts cobalt nitrate solution (20.5% CoO on an oxide basis) were first mixed together. For each combined 230 grams of the aqueous lanthanum nitrate/neodymium nitrate/yttrium nitrate solution, 190 grams of the aqueous magnesium nitrate solution, and 5 grams cobalt nitrate solution, enough deionized water was added thereto to provide 1 liter of impregnating/coating mixture. The container was rotated to cause the metal salt and water from the impregnating/coating mixture to be impregnated into the calcined particles by capillary action. Additionally, if the impregnating/coating mixture contained inorganic particles, the inorganic particles substantially remained on the surface and did not impregnate into the calcined particles. After this impregnation step, the resulting particles were fed into a rotary calciner as described previously. The resulting grains exited from the calciner and were fed into a 1,400° C. rotary kiln which was a 8.9 cm diameter, 1.32 meter long, silicon carbide tube inclined at 4.4 degrees with respect to the horizontal and having a 76 cm hot zone, rotating at 10.5 rpm, to provide a residence time therein of about 5 minutes. The product exited the kiln into room temperature air where it was collected in a metal container and allowed to cool to room temperature.

GENERAL PROCEDURE II FOR MAKING ABRASIVE GRAINS

The abrasive grains made according to General Procedure II were the abrasive grains of the present invention. About 500 grams sintered abrasive base grain and about 100 grams of grinding aid were charged into a mixer obtained from the Patterson Keller Company, Inc., of East Stroudsburg, Pa., as Model #L B 4766. The mixer had a volume of 14 liters (3.75 gallons) and did not have any baffles or flanges in its interior. The abrasive grains and grinding aid were mixed about 5 minutes. The material was removed from the mixer and the excess grinding aid powder screened off by tapping it through a screen for 10 minutes. The screen openings were finer than the abrasive particles but larger than the grinding aid particles to allow excess grinding aid to pass through but retain the abrasive grain.

GENERAL PROCEDURE FOR MAKING COATED ABRASIVE FIBER DISC(S)

The abrasive grains were utilized in coated abrasive products which were tested according to the test procedures described below. The coated abrasive products were made according to conventional coated abrasive making procedures. The abrasive grains were screened such that 50% by weight passed through a 30 mesh U.S. standard screen but were retained on a 35 mesh U.S. standard screen, and 50% by weight passed through a 35 mesh U.S. standard screen but were retained on a 40 mesh U.S. standard screen. The abrasive grains were bonded to vulcanized fiber backings that were 17.8 cm in diameter and contained a 2.2 cm center hole. The make resin was a conventional calcium carbonate filled phenolic. The size resin was a conventional cryolite filled phenolic. The make resin was precured for 90 minutes at 88° C. and the size resin was precured for 90 minutes at 88° C. followed by a final cure of 10 hours at 100° C. After curing, the fiber discs were flexed. The abrasive grains were electrostatically coated.

TEST PROCEDURE I

The coated abrasive disc was mounted on a beveled aluminum back-up pad, and used to grind the face of a 1.25 cm by 18 cm 304 stainless steel workpiece. The disc was driven at 5,500 rpm while the portion of the disc overlaying the beveled edge of the back-up pad contacted the workpiece at about a 6 kg load. Each disc was used to grind a separate workpiece for a one-minute interval for a total time of 12 minutes. The initial cut was the amount of metal removed in the first minute of grinding. The final cut was the amount of metal removed in the last minute of grinding. The total cut was the summation of the amount removed throughout the test.

TEST PROCEDURE I-S

Test Procedure I-S was the same as Test Procedure I except that each fiber disc tested was coated, using conventional techniques, with about 4 grams of a supersize comprising about 54.71% potassium tetrafluoroborate (98% pure micropulverized potassium tetrafluoroborate in which 95% by weight was passable through a 325 mesh screen and 100% by weight was passable through a 200 mesh screen, commercially available from Schutz-O'Neil of Minneapolis, Minn.), about 30.06% diglycidyl ether of bisphenol A epoxy resin (water-based; 60% solids; commercially available under the trade designation "CMD 35201" from Hi-Tek Polymers of Jeffersontown, Ky.), about 0.35% of a 25% solids aqueous 2-ethyl-4-methyl imidiazole solution (commercially available under the trade designation "EMI-24" from Air Products of Allentown, Pa.), about 2.28% red iron oxide powder (colorant), about 11.78% deionized water, about 0.76% wetting agent (commercially available under the trade designation "SURFYNOL PSA-326" from Air Products and Chemicals, of Allentown, Pa.), and about 0.03% defoamer (commercially available under the trade designation "ANTIFOAM 1430" from Dow Corning of Midland, Mich.).

TEST PROCEDURE II

Test Procedure II was the same as Test Procedure I, except the workpiece was 1018 mild steel.

TEST PROCEDURE III

Test Procedure III was designed to measure the time it took for the abrasive grain to shell from a coated abrasive disc. The test equipment included a 17.8 cm diameter test coated abrasive disc with a 2.2 cm mounting hole attached to a 16.5 cm diameter 1.57 mm thick hard phenolic backup pad which was in turn mounted on a 15.2 cm diameter steel flange. The test disc so supported was rotated counterclockwise at 3,550 rpm. The 1.8 mm peripheral edge of a 25 cm diameter 1018 carbon steel disc shaped workpiece deployed 18.5° from a position normal to the abrasive disc and rotated counterclockwise at 2 rpm was placed into contact with the abrasive face of the abrasive disc under a load of 2.9 kg. At the start of the test and at 120 second intervals, the workpiece was weighed to determine the amount of steel removed or abraded. The test endpoint was 12 minutes, or when the disc began to shell (i.e., a substantial portion of its abrasive grains flew off the discs), whichever occurred first. The total cut was the amount of steel abraded during the entire test.

EXAMPLES 1-3 AND COMPARATIVE A

This set of examples compared coatings of different grinding aids. Examples 1-3 were made according to the General Procedure II using Comparative A as the base grain.

COMPARATIVE A

The grain for Comparative A was made according to the General Procedure I, except the impregnating/coating mixture additionally contained 15 grams of alumina trihydrate powder (0.5 micrometer in size; commercially available under the trade designation "HYDRAL 705" from Alcoa, U.S.A., of Bauxite, Ariz.). About 1,000 grams of the calcined particles were combined with about 500 ml of the impregnating/coating mixture, wherein the carrier fluid was deionized water. The abrasive grain was ANSI grade 50.

EXAMPLE 1

For Example 1, Comparative A grain and −325 mesh powdered cryolite were charged into the mixer. The cryolite was a finely ground synthetic cryolite commercially available from Washington Mills Electro Minerals Corp. of North Grafton, Mass., under the trade designation "ABB UF."

EXAMPLE 2

Example 2 was prepared as described in Example 1 except the grinding aid was potassium tetrafluoroborate (98% pure micropulverized potassium tetrafluoroborate in which 95 percent by weight was passable through a 325 mesh screen, and 100% by weight was passable through a 200 mesh screen; commercially available from Schutz-O'Neil of Minneapolis, Minn.), rather than cryolite.

EXAMPLE 3

Example 3 was prepared as described in Example 1 except equal amounts of (i.e., 50 grams of each of) the potassium tetrafluoroborate (described in Example 2) and the cryolite were used as the grinding aid. The cryolite was ball milled about 24 hours in a 3 liter ball mill with 0.63 cm (0.25 inch) alumina media (balls) at 75 rpm.

The abrasive grains of each of Examples 1-3 and Comparative A were incorporated into fiber discs and tested according to Test Procedures I, I-S, II, and III. The test results can be found in Table 1, below. All tests results are based upon a percent of the Comparative A.

TABLE 1

| Example | Test Proc. I Total cut, % of Comparative A* | Test Proc. I-S Total cut, % of Comparative A* | Test Proc. II Total cut, % of Comparative A* | Test Proc. III Total cut, % of Comparative A* |
| --- | --- | --- | --- | --- |
| 1 | 107 (3) | 114 (3) | 108 (3) | 106 (3) |
| 2 | 116 (3) | 123 (3) | 122 (3) | 103 (3) |
| 3 | 109 (3) | 124 (3) | 126 (3) | 100 (3) |
| Comp A | 100 (3) | 100 (3) | 100 (3) | 100 (2) |

*Number of fiber discs tested in parenthesis.

EXAMPLES 4–8 AND COMPARATIVE B

This set of examples compared different grinding aids on (ANSI) grade 36 abrasive grain.

COMPARATIVE B

The grain for Comparative B was the same as for Comparative A except it was in ANSI grade 36 rather than grade 50.

EXAMPLE 4

Example 4 was prepared as described in Example 1 except Comparative B grain was used rather than Comparative A grain, and potassium tetrafluoroborate (described in Example 2) was used rather than cryolite. Collectively, the abrasive grains had about 5 grams of grinding aid attached to the surface thereof.

EXAMPLE 5

Example 5 was prepared as described in Example 4 except the potassium tetrafluoroborate was charged into a 3 liter ball mill with 0.63 cm (0.25 inch) alumina media (balls) and dry ball milled at 75 rpm for about 2 hours prior to being charged into the mixer. The resulting abrasive grains collectively had about 10 grams of grinding aid attached to the surface thereof.

EXAMPLE 6

Example 6 was prepared as described in Example 5 except the potassium tetrafluoroborate was dry ball milled for about 4 hours prior to being charged into the mixer. The resulting abrasive grains collectively had about 10 grams of grinding aid attached to the surfaces thereof.

EXAMPLE 7

Example 7 was prepared as described in Example 4 except the grinding aid was boron nitride (1 micrometer average particle size; commercially available from Cerac, Inc., of Milwaukee, Wis.).

EXAMPLE 8

Example 8 was prepared as described in Example 4 except the grinding aid was graphite (2 micrometer average particle size; commercially available from Cerac, Inc., of Milwaukee, Wis.).

The abrasive grains of each example were each incorporated into fiber discs and tested according to Test Procedure II. The test results can be found in Table 2, below.

TABLE 2

| Example | Test Proc II Total cut, % of Comparative B* |
| --- | --- |
| 4 | 115 (1) |
| 5 | 131 (1) |
| 6 | 132 (1) |
| 7 | 106 (1) |
| 8 | 106 (1) |
| Comparative B | 100 (1) |

*Number of fiber discs tested in parenthesis.

EXAMPLES 9–10 AND COMPARATIVE C

This set of examples compared various abrasive grain compositions.

COMPARATIVE C

The abrasive grain for Comparative C was an (ANSI) grade 36 alpha alumina-based sol-gel-derived grain commercially available from the 3M Company, St. Paul, Minn., under the trade designation "321 CUBITRON ABRASIVE GRAIN."

EXAMPLE 9

Example 9 was prepared as described in Example 3 except the base grain was Comparative Example C grain and the potassium tetrafluoroborate and cryolite were dry ball milled as described in Example 5 prior to being charged into the mixer.

EXAMPLE 10

Example 10 was prepared as described in Example 9 except the base grain was Comparative B.

The abrasive grains of each example were each incorporated into fiber discs and tested according to Test Procedure I-S. The test results can be found in Table 3, below.

TABLE 3

| Example | Test Proc I-S Total cut, % of Comparative C* |
| --- | --- |
| 9 | 123 |
| 10 | 142 |
| Comparative B | 118 |
| Comparative C | 100 |

EXAMPLES 11–13 AND COMPARATIVE A

This set of examples compared different grinding aids on (ANSI) grade 50 abrasive grain.

EXAMPLE 11

Example 11 was made according to the General Procedure II using Comparative A as the base grain, except about 200 grams of the base grain were mixed with about 50 grams of the grinding aid. The grinding aid was potassium tetrafluoroborate which had been dry ball milled as described in Example 5 for about 4 hours prior to being charged into the mixer.

EXAMPLE 12

Example 12 was prepared as described in Example 11, except about 15 grams of the grinding aid was mixed with the base grain.

EXAMPLE 13

Example 13 was prepared as described in Example 11, except the grinding aid was zinc sulfide powder (average particle size of about 2 micrometers; commercially available from Johnson & Mathey Co. of Ward Hill, Mass.).

The abrasive grains of each example were each incorporated into fiber discs and tested according to Test Procedure I-S. The test results can be found in Table 4, below.

TABLE 4

| Example | Test Proc I-S Total cut, % of Comparative A* |
|---|---|
| 11 | 115 (4) |
| 12 | 105 (4) |
| 13 | 103 (4) |
| Comparative A | 100 (4) |

*Number of fiber discs tested in parenthesis.

EXAMPLES 14-15 AND COMPARATIVE D

This set of examples compared different grinding aids on (ANSI) grade 36 abrasive grain.

COMPARATIVE D

The abrasive grain for Comparative D was a sol-gel-derived, alumina-based abrasive grain having a surface coating as described in U.S. Pat. No. 5,011,508 (Wald et al.). Comparative D was prepared according to "General Procedure I for Making Abrasive Grains," except prior to the first calcination step (i.e., the calcination step prior to impregnation), about 135 kg (300 lbs) of the screened particles were tumbled for about 5 minutes at about 16 rpm in a conventional ball mill, wherein the chamber was about 1.8 m (6 ft.) in diameter and about 30 cm (1 ft.) long. Further, baffles (5.1 cm high by 5.1 cm thick) were spaced at 46 cm intervals around the inside circumference of the ball mill. The tumbled particles were then calcined. Impregnation was conducted by combining about 1,000 grams of the tumbled-calcined particles with about 500 ml of the impregnation coating mixture.

EXAMPLE 14

Example 14 was made according to the General Procedure II using Comparative D as the base grain, except about 70 grams of the base grain were mixed with about 20 grams of the grinding aid. The grinding aid was potassium tetrafluoroborate which had been dry ball milled as described in Example 5 for about 4 hours prior to being charged into the mixer.

EXAMPLE 15

Example 15 was made according to the General Procedure II using Comparative D as the base grain, except about 70 grams of the base grain were mixed with about 20 grams of zinc sulfide powder (described in Example 13).

The abrasive grains of each example were each incorporated into fiber discs and tested according to Test Procedure I-S. The test results can be found in Table 5, below.

TABLE 5

| Example | Test Proc I-S Total cut, % of Comparative D* |
|---|---|
| 14 | 107 (2) |
| 15 | 116 (2) |
| Comparative D | 100 (2) |

*Number of fiber discs tested in parenthesis.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. An abrasive grain comprising:
   (i) an abrasive particle having an outer surface; and
   (ii) grinding aid material bonded to said outer surface via interparticle attraction.

2. The abrasive grain according to claim 1 wherein said grinding aid material covers at least 10% of said outer surface.

3. The abrasive grain according to claim 2 wherein said abrasive particle is a sintered alpha alumina-based ceramic particle.

4. A plurality of abrasive grain according to claim 3 wherein each abrasive particle has an average particle size within the range of about 10 micrometers to about 4,000 micrometers.

5. The abrasive grain according to claim 4 wherein said grinding aid material is selected from the group consisting of waxes, organic halide compounds, halide salts and metals and their alloys, and combinations thereof.

6. The abrasive grain according to claim 4 wherein said grinding aid material is selected from the group consisting of chlorinated waxes, sodium chloride, potassium cryolite, potassium fluorophosphate, sodium cryolite, ammonium cryolite, potassium tetrafluoroborate, calcium fluoride, sodium tetrafluoroborate, ammonium chloride, silicon fluorides, potassium chloride, magnesium chloride, tin, lead, bismuth, cobalt, antimony, cadmium, iron, titanium, sulfur, organic sulfur compounds, graphite, zinc stearate, lithium stearate, boron nitride, iron pyrites, metallic sulfides, and combinations thereof.

7. The abrasive grain according to claim 4 wherein said sintered alpha alumina-based ceramic particle comprises alpha alumina and metal oxide modifier.

8. The abrasive grain according to claim 4 wherein said sintered alpha alumina-based ceramic particle comprises a sintered reaction product of a rare earth metal oxide with alumina.

9. The abrasive grain according to claim 4 wherein said outer surface includes separated protuberant masses of autogenously bonded inorganic material.

10. The abrasive grain according to claim 2 wherein said abrasive particle is made of a material selected from the group consisting of fused alumina, fused alumina-zirconia, cubic boron nitride, diamond, silicon nitride, silicon carbide, garnet, and cubic boron carbide.

11. An abrasive article comprising:
    (a) an organic binder; and
    (b) a plurality of abrasive grains secured within said abrasive article by said organic binder; said abrasive grains including abrasive grain according to claim 4.

12. An abrasive article according to claim 11 in the form of a wheel.

13. A coated abrasive article comprising:
    (a) a backing having a major surface; and
    (b) an abrasive layer attached to said major surface of said backing, said abrasive layer comprising a binder and a plurality of abrasive grain, said plurality of abrasive grain including abrasive grain according to claim 4.

14. A three-dimensional, low density abrasive article comprising an open, porous lofty polymer filament structure having a plurality of abrasive grain distributed throughout and adhesively bonded within said structure by an adhesive material, said plurality of abrasive grain including abrasive grain according to claim 4.

15. Abrasive grain comprising sintered ceramic particles having an average particle size within the range of about 10 micrometers to about 4,000 micrometers, each particle comprising:
    (i) a sintered alpha alumina-based ceramic core having a surface area;
    (ii) a coating of inorganic particulates autogenously bonded to said alpha alumina-based core; said coating covering at least 70% of the surface area of said alpha alumina-based core to provide an outer surface; and
    (iii) grinding aid material bonded onto at least a portion of said outer surface via interparticle attraction.

16. The abrasive grain according to claim 15 wherein said grinding aid material is selected from the group consisting of waxes, organic halide compounds, halide salts and metals and their alloys, and combinations thereof.

17. The abrasive grain according to claim 15 wherein said grinding aid material is selected from the group consisting of chlorinated waxes, sodium chloride, potassium cryolite, potassium fluorophosphate, sodium cryolite, ammonium cryolite, potassium tetrafluoroborate, calcium fluoride, sodium tetrafluoroborate, ammonium chloride, silicon fluorides, potassium chloride, magnesium chloride, tin, lead, bismuth, cobalt, antimony, cadmium, iron, titanium, sulfur, organic sulfur compounds, graphite, zinc stearate, lithium stearate, boron nitride, iron pyrites, metallic sulfides, and combinations thereof.

18. The abrasive grain according to claim 15 wherein said grinding aid material covers at least 10% of said outer surface.

19. The abrasive grain according to claim 15 wherein said sintered alpha alumina-based ceramic core comprises alpha alumina and metal oxide modifier.

20. The abrasive grain according to claim 15 wherein said sintered alpha alumina-based ceramic core comprises a sintered reaction product of a rare earth metal oxide with alumina.

21. An abrasive article comprising:
    (a) a binder; and
    (b) a plurality of abrasive grains secured within an abrasive article by said organic binder; said plurality of abrasive grain includes abrasive grain according to claim 15.

22. An abrasive article according to claim 21 in the form of a wheel.

23. A coated abrasive article comprising:
    (a) a backing having a major surface; and
    (b) an abrasive layer attached to said major surface of said backing, said abrasive layer comprising a binder and a plurality of abrasive grain, said plurality of abrasive grain including abrasive grain according to claim 15.

24. A three-dimensional, low density abrasive article comprising an open, porous lofty polymer filament structure having a plurality of abrasive grain distributed throughout and adhesively bonded within said structure by an adhesive material, said plurality of abrasive grain including abrasive grain according to claim 15.

25. A method for making abrasive grain comprising:
    (i) an abrasive particle having an outer surface; and
    (ii) grinding aid material bonded said outer surface via interparticle attraction,
    said method comprising the step of mixing a plurality of abrasive particles with a sufficient amount of a grinding aid material for a time sufficient to provide said abrasive grain.

26. The abrasive grain according to claim 25 wherein said grinding aid material covers at least 10% of said outer surface.

27. The method according to claim 26 wherein said abrasive particle is a sintered alpha alumina-based ceramic particle.

28. The method according to claim 27 wherein said grinding aid material selected is from the group consisting of waxes, organic halide compounds, halide salts and metals and their alloys, and combinations thereof.

29. The method according to claim 27 wherein said grinding aid material is selected from the group consisting of chlorinated waxes, sodium chloride, potassium cryolite, potassium fluorophosphate, sodium cryolite, ammonium cryolite, potassium tetrafluoroborate, calcium fluoride, sodium tetrafluoroborate, ammonium chloride, silicon fluorides, potassium chloride, magnesium chloride, tin, lead, bismuth, cobalt, antimony, cadmium, iron, titanium, sulfur, organic sulfur compounds, graphite, zinc stearate, lithium stearate, boron nitride, iron pyrites, metallic sulfides, and combinations thereof.

30. The method according to claim 27 wherein the weight ratio of grinding aid material to sintered alpha alumina-based ceramic particles during said step of mixing is in the range from about 1:100 to about 1:1.

31. A method of making an abrasive article, said method comprising the steps of:
    (A) making abrasive grain according to the method of claim 27; and
    (B) incorporating said abrasive grain into an abrasive article comprising an organic binder.

32. A method of making ceramic abrasive grain comprising sintered particles having an average particle size within the range of about 10 micrometers to about 4,000 micrometers, each particle comprising:
    (i) a sintered alpha alumina-based ceramic core having a surface area;
    (ii) a coating of inorganic particulates autogenously bonded to said alpha alumina-based core; said coating covering at least 70% of the surface area of said alpha alumina-based core to provide an outer surface; and
    (iii) grinding aid material bonded onto at least a portion of said outer surface area via interparticle attraction,
said method comprising the step of mixing a plurality of sintered particles having an average particle size within the range of about 10 micrometers to about 4,000 micrometers, each particle comprising:

(i) a sintered alpha alumina-based ceramic core having a surface area; and
(ii) a coating of inorganic particulates autogenously bonded to said alpha alumina-based core; said coating covering at least 70% of said surface area of said alpha alumina-based core with a sufficient amount of grinding aid material for a time sufficient to provide said abrasive grain.

33. The method according to claim 32 wherein said grinding aid material is selected from the group consisting of waxes, organic halide compounds, halide salts and metals and their alloys, and combinations thereof.

34. The method according to claim 32 wherein said grinding aid material is selected from the group consisting of chlorinated waxes, sodium chloride, potassium cryolite, potassium fluorophosphate, sodium cryolite, ammonium cryolite, potassium tetrafluoroborate, calcium fluoride, sodium tetrafluoroborate, ammonium chloride, silicon fluorides, potassium chloride, magnesium chloride, tin, lead, bismuth, cobalt, antimony, cadmium, iron, titanium, sulfur, organic sulfur compounds, graphite, zinc stearate, lithium stearate, boron nitride, iron pyrites, metallic sulfides, and combinations thereof.

35. The method according to claim 32 wherein the weight ratio of grinding aid material to sintered alpha alumina-based ceramic particles during said step of mixing is in the range from about 1:100 to about 1:1.

36. The abrasive grain according to claim 32 wherein said grinding aid material covers at least 10% of said outer surface.

* * * * *